United States Patent [19]

Morita

[11] Patent Number: 4,798,479
[45] Date of Patent: Jan. 17, 1989

[54] SHEET-METAL TYPE ENDLESS RECTILINEAR MOTION ROLLING GUIDE UNIT

[75] Inventor: Kunihiko Morita, Koganei, Japan

[73] Assignee: Nippon Thompson Co., Ltd., Tokyo, Japan

[21] Appl. No.: 169,894

[22] Filed: Mar. 18, 1988

[30] Foreign Application Priority Data

Apr. 14, 1987 [JP] Japan .................. 62-56203[U]

[51] Int. Cl.[4] ............................................. F16C 29/06
[52] U.S. Cl. ..................................................... 384/45
[58] Field of Search .............................. 384/45, 43, 44; 464/168

[56] References Cited

U.S. PATENT DOCUMENTS

| | | | |
|---|---|---|---|
| 4,478,462 | 10/1984 | Teramachi | 384/45 |
| 4,552,416 | 11/1985 | Lehmann et al. | 384/45 |
| 4,647,226 | 3/1987 | Mottate | 384/45 |
| 4,655,612 | 4/1987 | Lunz et al. | 384/45 |

Primary Examiner—Lenard A. Footland
Attorney, Agent, or Firm—Rogers & Killeen

[57] ABSTRACT

There is provided a sheet-metal type endless rectilinear motion rolling guide unit comprising U-shaped bed and table which are arranged so that their opening portions face each other. A first track groove is formed in each outside wall of the bed in the longitudinal direction. A second track groove is formed in each inside wall of the table in the longitudinal direction. Balls are inserted between these track grooves, thereby relatively rectilinearly moving the bed and table. A third tract groove is formed in each outside wall of the table at the position corresponding to the second track groove. A U-shaped return passage side plate forming a return passage of the balls is attached to each outside wall of the table in parallel with the second track groove. An end cap formed with a direction turning passage to couple the second track groove with the return passage is attached to each end of the track groove portion in the slide direction of the table. The return passage side plate and the end cap can be integrally molded by the same material. With this structure, the rolling guide unit can be cheaply manufacturing with high rigidity and high accuracy.

2 Claims, 3 Drawing Sheets

SHEET-METAL TYPE ENDLESS RECTILINEAR MOTION ROLLING GUIDE UNIT

FIELD OF THE INVENTION

The present invention relates to a linear motion rolling guide unit for an endless rectilinear motion which is used in the slide portions in machines, electric apparatuses, measuring instruments, and the like and, more particularly, to a sheet-metal type endless rectilinear motion rolling guide unit adapted to use under conditions such that a load which is applied to the linear motion rolling guide unit is relatively small and it is required to slide at a high accuracy with a small slide resistance.

RELATED BACKGROUND ART

A conventional endless rectilinear motion rolling guide unit has a structure as shown in, e.g., Japanese patent application No. 59-254067 (Japanese patent application disclosure No. 61-136018) which has been proposed by the same applicant as this invention. In a track member having a U-shaped cross section, a table is located inside of a bed and an endless circulating passage for balls is formed around the wall surface of the table.

According to this structure, in the case of reducing a width of bed to miniaturize the linear motion rolling guide unit (for example, a width of linear motion rolling guide unit is set to about 10 mm), it is physically impossible to keep a space enough to form a pair of endless circulating passages in the table. Or, in order to assure the space of the endless circulating passages, a thickness of table in the track groove portion must be thinned. Thus, there is a drawback such that the rigidity of linear motion rolling guide unit deteriorates.

On the other hand, since the balls locating in the track groove are exposed from the upper portion, foreign matters easily enter the track groove portion, causing the linear motion rolling guide unit to be damaged early.

As mentioned above, the conventional sheet-metal type endless rectilinear motion rolling guide unit has a light weight and a high accurate moving performance but, contrarily, has drawbacks such that the width of whole linear motion rolling guide unit cannot be narrowed and the portions which are difficult to be handled still exist.

SUMMARY OF THE INVENTION

It is an object of the present invention to provide a sheet-metal type endless rectilinear motion rolling guide unit suitable for use in conditions such that a load which is applied to a linear motion rolling guide unit is relatively small and it is required to slide at a high accuracy with a small slide resistance.

This object is accomplished by a sheet-metal type endless rectilinear motion rolling guide unit in which two track members made of sheet-metal plates each having a U-shaped cross section are so arranged that the bottom surfaces face each other and track grooves face each other, and a number of rolling members are inserted between the track grooves, thereby relatively rectilinearly moving track members, wherein this rolling guide unit has the following features.

A first track groove (1a) is formed in a bed (1) serving as one of the track members in the longitudinal direction of each of the outside walls of the bed (1). A second track groove (2a) is formed in a table (2) serving as the other track member in the longitudinal direction of each of the inside walls of the table (2) so as to face the first track groove (1a) formed in the bed (1). A return passage side plate (5) having a U-shaped cross section is attached at the opposing free edges and in parallel with the second track groove (2a) to the outside wall of the table (2) corresponding to the back side of the second track groove (2a) formed in the inside wall of the table (2). The return passage side plate (5) forms a return passage (5a) of rolling members (3). An end cap (4) formed with a direction turning passage (4b) to couple the second track groove (2a) and return passage (5a) is attached to each of both ends of the track groove portion in the slide direction of the table (2). The return passage side plate (5) and end cap (4) can be integrally molded by the same material.

According to the linear motion rolling guide unit of the invention, the following advantages are obtained.

(1) The linear motion rolling guide unit can be miniaturized and manufactured as a unit having a high rigidity.

(2) Since the parts are worked by a plastics machining and injection molding, the mass productivity is high and the manufacturing cost is low.

(3) In the case of using the beds of the same shape and dimensions, according to the conventional linear motion rolling guide unit, the track groove of the bed is formed in the inside wall of the linear motion rolling guide unit; on the other hand, according to the present invention, since the guide groove (1a) of the bed (1) is formed in the outside wall of the bed (1), the linear motion rolling guide unit of the invention is stronger to the moment.

The above and other objects and features of the present invention will become apparent from the following detailed description and the appended claims with reference to the accompanying drawings.

DETAILED DESCRIPTION OF A PREFERRED EMBODIMENT

A linear motion rolling guide unit according to an embodiment of the present invention will be described in detail hereinbelow with reference to FIGS. 1 to 3.

Figure 1:
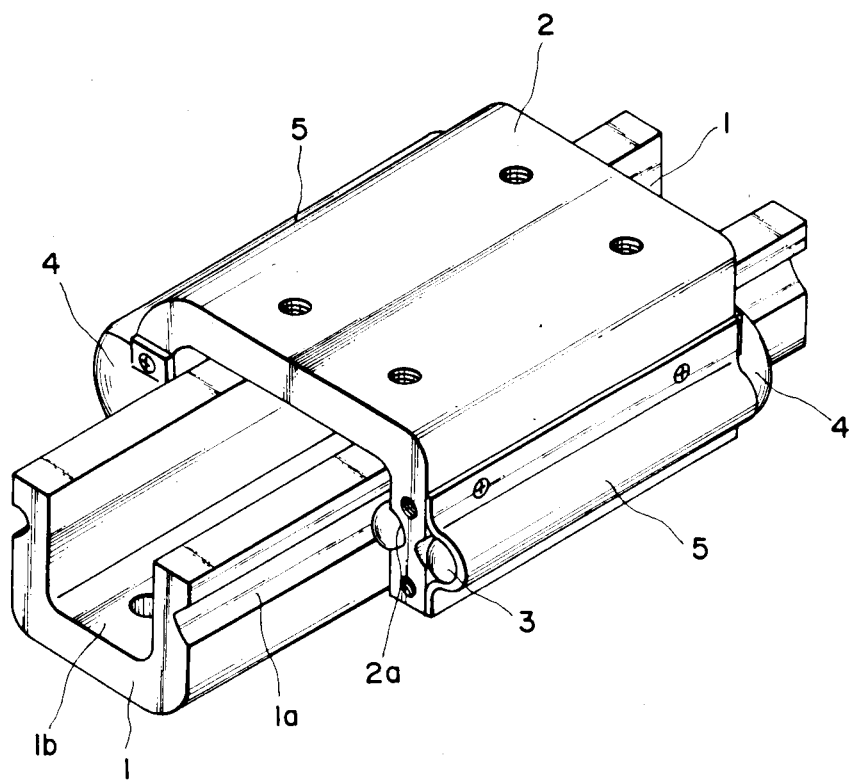
FIG. 1 is a perspective view of a linear motion rolling guide unit in an embodiment of the present invention.

FIG. 1 is a perspective view showing a linear motion rolling guide unit in a state in which one of four end caps 4 attached at four positions of a table 2 is removed. FIG. 2 is a front view and FIG. 3 is a plan view of the rolling guide unit.

Track members of this linear motion rolling guide unit comprise a bed 1 and the table 2 which are made of sheet-metal plates each having a U-shaped cross section. A track groove 1a is formed in a part of the outside wall of the bed 1 in the longitudinal direction. Another track groove 2a is formed in a part of the inside wall of the table 2 in the longitudinal direction of the table 2 at a position so as to face the track groove 1a of the bed 1. The bed 1 and table 2 are assembled such that a bottom surface 1b of the bed 1 faces a bottom surface 2b of the table 2 and that the track groove 1a of the bed 1 faces the track groove 2a of the table 2. A number of balls as rolling members are inserted between the opposite track grooves 1a and 2a. In this manner, an endless rectilinear motion rolling guide unit is constructed.

A return passage side plate 5 having a U-shaped cross section is fixed at the opposing free edges to each outside wall on both sides of the table 2 by flush head screws in parallel with the track groove 2a. A return passage to endlessly circulate the balls 3 is formed by the return passage side plates 5.

The track groove 2a is coupled with a return passage 5a by a direction turning passage 4b. A scooping portion 4a is formed in the end portion on the side of the track groove 2a. The end cap 4 is constructed by the direction return passage 4b and scooping portion 4a. The end cap 4 is attached to each end portion of the return passage side plate 5. Thus, an endless circulating passage for the balls 3 is realized.

Figure 2:
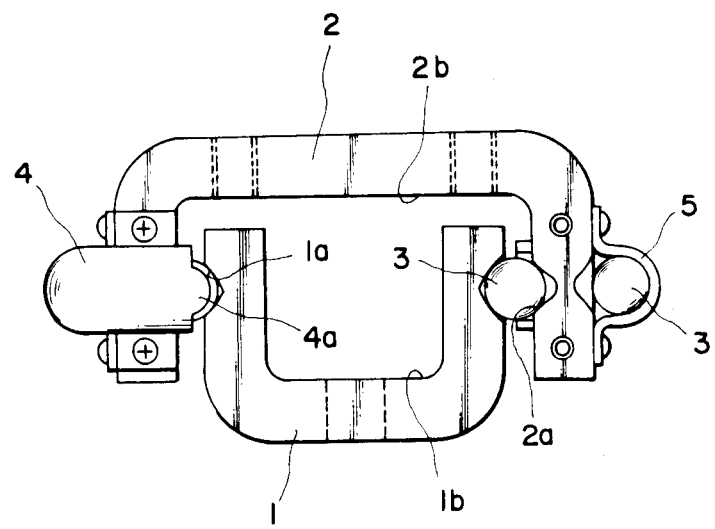
FIG. 2 is a front view of the rolling guide unit of FIG. 1.

In the front view of FIG. 2, the tracks of the balls 3 in the linear motion rolling guide unit are set to the simplest two tracks. Each of the track grooves 1a and 2a has a shape of a Gothic arch groove. The return passage side plate 5 is made of plastic working a steel plate. However, the side plate 5 may be also formed by injection molding a synthetic resin in accordance with the use condition of the linear motion rolling guide unit.

Since the end cap 4 has the scooping portion 4a to couple the load range and the loadless range of the balls 3 and to guide the balls 3, the end cap 4 is made of a steel plate in a manner similar to the return passage side plate 5. The end cap 4 may be also made of a synthetic resin in accordance with the use condition. On the other hand, the return passage side plate 5 and end caps 4 can be also integrally molded by the same material in dependence on a size and material of the linear motion rolling guide unit. In this case, the manufacturing cost becomes cheap.

Figure 3:
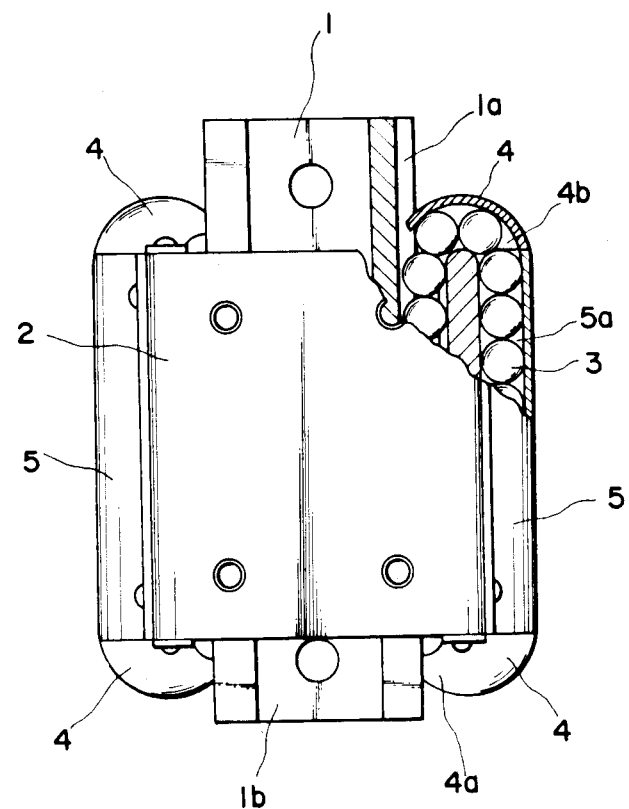
FIG. 3 is a plan view of the rolling guide unit of FIG. 2.

In the plan view of FIG. 3, the load balls 3 locating in the load track grooves 1a and 2a are scooped by the scooping portion 4a of the end cap 4 and are released from the load and move to the direction turning passage 4b formed in the end cap 4.

The balls 3 in the direction turning passage 4b move to the return passage 5a which is substantially parallel with the track groove 2a while being supported by the return passage side plate 5.

As described above, according to the endless rectilinear motion rolling guide unit of the invention, the number of parts can be minimized, the weight of the whole rolling guide unit is reduced, and the accuracy of the rolling guide unit can be held to be high without losing the rigidity of the track members.

Although the embodiment has been described with respect to the case where the balls are used as rolling members, rollers can be also used as the rolling members.

On the other hand, the cross sectional shape of the bed is not limited to only the U-shape as in the embodiment but may be set to a C or almost square shape to increase the rigidity.

The present invention is not limited to the foregoing embodiment but many modifications and variations are possible within the spirit and scope of the appended claims of the invention.

What is claimed is:

1. A sheet-metal type endless rectilinear motion rolling guide unit in which two track members made of sheet-metal plates each having a U-shaped cross section are arranged such that bottom surfaces (1b and 2b) of said track members face each other and first and second track grooves (1a and 2a) of said track members face each other, and a number of rolling members (3) are inserted between said track grooves (1a and 2a), thereby relatively rectilinearly moving the track members, wherein:

the first track groove (1a) is formed in each of outside walls of a bed (1) serving as one of said two track members in the longitudinal direction of said bed (1);

the second track groove (2a) is formed in each of inside walls of a table (2) serving as the other track member in the longitudinal direction of said table (2) so as to face said first track groove (1a) formed in the bed (1);

a return passage side plate (5) having a U-shaped cross section and forming a return passage (5a) of the rolling members (3) is attached at the opposing free edges and in parallel with the second track groove (2a) to each of outside walls of the table (2) on the back side of the second track groove (2a) formed in the inside wall of the table (2); and an end cap (4) formed with a direction turning passage (4b) to couple the second track groove (2a) and the return passage (5a) is attached to each of both ends of the track groove portion in a slide direction of the table (2).

2. A rolling guide unit according to claim 1, wherein said return passage side plate (5) and said end cap (4) are integrally molded by a same material.

* * * * *